(12) United States Patent
Fu

(10) Patent No.: US 8,189,721 B2
(45) Date of Patent: May 29, 2012

(54) CHANNEL ESTIMATION APPARATUS AND METHOD FOR THE SAME

(75) Inventor: Po-Wei Fu, Taipei County (TW)

(73) Assignee: ITE Tech. Inc., Hsinchu (TW)

( * ) Notice: Subject to any disclaimer, the term of this patent is extended or adjusted under 35 U.S.C. 154(b) by 868 days.

(21) Appl. No.: 12/204,799

(22) Filed: Sep. 4, 2008

(65) Prior Publication Data

US 2009/0060103 A1 Mar. 5, 2009

(30) Foreign Application Priority Data

Sep. 5, 2007 (TW) .............................. 96133053 A

(51) Int. Cl.
*H04L 27/08* (2006.01)
(52) U.S. Cl. ........................................ 375/345; 375/340
(58) Field of Classification Search .................. 375/345, 375/340
See application file for complete search history.

(56) References Cited

U.S. PATENT DOCUMENTS

| | | | |
|---|---|---|---|
| 6,608,863 B1 | 8/2003 | Onizawa et al. | |
| 6,754,170 B1 * | 6/2004 | Ward | 370/208 |
| 7,260,055 B2 | 8/2007 | Wang et al. | |
| 2004/0100898 A1 * | 5/2004 | Anim-Appiah et al. | 370/210 |
| 2006/0233268 A1 * | 10/2006 | Frank et al. | 375/260 |

* cited by examiner

*Primary Examiner* — Shuwang Liu
*Assistant Examiner* — Michael Neff
(74) *Attorney, Agent, or Firm* — Jianq Chyun IP Office

(57) ABSTRACT

A channel estimation apparatus and a method for the same are provided. The channel estimation apparatus includes a preamble buffer unit, a gain adjusting unit, a demodulation unit, and an estimation unit. The preamble buffer unit receives and temporarily stores a plurality of symbols in preamble signal. The symbols correspond to a plurality of gain control values. The gain adjusting unit adjusts the symbols to a plurality of gain normalized symbols according to the gain control values. The demodulation unit receives the gain normalized symbols and demodulates the same to obtain a frequency domain demodulation signal. The estimation unit receives the frequency domain demodulation signal and performs a channel estimation about the frequency domain demodulation signal and a frequency domain reference value of a standard preamble signal, so as to obtain a channel frequency response.

15 Claims, 4 Drawing Sheets

Channel Estimation Apparatus 200

CHANNEL ESTIMATION APPARATUS AND METHOD FOR THE SAME

CROSS-REFERENCE TO RELATED APPLICATION

This application claims the priority benefit of Taiwan application serial no. 96133053, filed on Sep. 5, 2007. The entirety of the above-mentioned patent application is hereby incorporated by reference herein and made a part of this specification.

BACKGROUND OF THE INVENTION

1. Field of the Invention

The present invention generally relates to a channel estimation technique, and more particularly, to channel estimation technique in a frequency domain.

2. Description of Related Art

In a communication system, a channel of poor quality often affects signals transmitted in the channel and thus lowering the quality of the received signals and causing data transmission error. In a so-called frequency-selective fading channel, different frequency bands are affected by different channel effects. In order to compensate the damage of the received signals caused by channel variation, the receiving end must be capable of accurately estimating the channel, so as to achieving reliable coherent detection, and correctly identifying symbols from the received signals.

According to some communication systems, before transmitting data, the transmitting ends thereof are adapted to transmit a preamble signal for the receiving end to perform channel estimation, or timing synchronization, or the like. For example, in a wireless local area network (WLAN) or a digital audio broadcasting (DAB) system, a transmitting end thereof pre-transmits a preamble signal or a reference symbol to a receiving end thereof allowing the receiving end to perform a channel estimation so as to correctly identify a symbol from the received signals.

Because of the importance of channel estimation, methods for the same are being proposed in international periods, conferences, and U.S. patents. For example, S. K. Wilson et al., in "16 QAM Modulation with Orthogonal Frequency Division Multiplexing in a Rayleigh-Fading Environment", Proc. Of VTC'94, pp 1660-1664; P. Hoeher, in "TCM on Frequency-selective Land-Mobile Fading Channels", Proc. Of $5^{th}$ Tirrenia International Workshop Digital Communication, Tirrenia, Italy, September 1991; and U.S. Pat. No. 6,608,863, respectively proposes an orthogonal frequency division multiplexing system. According to such an orthogonal frequency division multiplexing (OFDM) system, after the timing synchronization is completed, a symbol is then transformed by a fast Fourier transform (FFT), and then channel estimation is performed according to characteristic values of each subcarrier of the symbol. Further, U.S. Pat. No. 7,260,055, proposes to perform a channel estimation in a frequency domain with an average of two equivalent long training symbols. However, the methods for channel estimation as mentioned above all rely on one or two symbols of the preamble signal, which cause the channel estimation inaccurate so that the receiving end can not achieve a reliable coherent detection.

SUMMARY OF THE INVENTION

Accordingly, the present invention is directed to a channel estimation apparatus, which is adapted for using a plurality of symbols of a preamble signal to achieve an accurate channel estimation.

The present invention is also directed to a method for a channel estimation. The method is adapted to correctly identifying a symbol from received signals according to a plurality of symbols of a preamble signal.

For achieving the foregoing and other objects, the present invention provides a channel estimation apparatus. The channel estimation apparatus includes a preamble buffer unit, a gain adjusting unit, a demodulation unit, and an estimation unit. The preamble buffer unit receives and temporarily stores a plurality of symbols of preamble signal. The symbols correspond to a plurality of gain control values. The gain adjusting unit adjusts the symbols to a plurality of gain normalized symbols according to the gain control values. The demodulation unit receives the gain normalized symbols and demodulates the same to obtain a frequency domain demodulation signal. The estimation unit receives the frequency domain demodulation signal and performs a channel estimation about the frequency domain demodulation signal and a frequency domain reference value of a standard preamble signal, so as to obtain a channel frequency response.

The present invention further provides a method for channel estimation. The method includes: receiving a plurality of symbols of a preamble signal, the symbols corresponding to a plurality of gain control values; adjusting the symbols to a plurality of gain normalized symbols according to the gain control values; demodulating the gain normalized symbols to obtain a frequency demodulation signal; and performing a channel estimation about the frequency domain demodulation signal and a frequency domain reference value of a standard preamble signal, and so as to obtain a channel frequency response.

The present invention takes advantages of a plurality of symbols, and thus can achieve an accurate channel estimation for compensating damages of the signals because of the channel variation.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
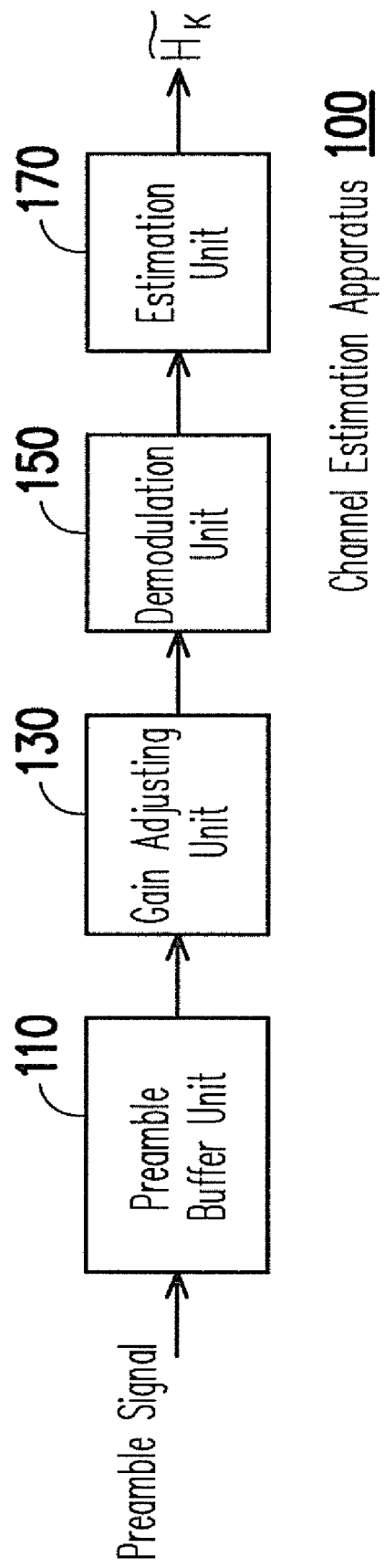
FIG. 1 is a block diagram illustrating a channel estimation apparatus according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Currently, relying on one or two symbols of a preamble signal, all of the conventional channel estimation technologies are capable of roughly estimating responses of a channel corresponding to different frequencies only. Therefore, the present invention provides a channel estimation apparatus adapted to accurately estimate channel responses according to a plurality of symbols of a preamble signal, so as to correctly identifying a symbol from received signals.

For convenience of illustration, a transmittance regulation according to the Home-Plug AV standard is taken as an example without restricting the scope of the present invention.

FIG. 1 is a block diagram illustrating a channel estimation apparatus according to an embodiment of the present invention. Referring to FIG. 1, the channel estimation apparatus 100 includes a preamble buffer unit 110, a gain adjusting unit 130, a demodulation unit 150, and an estimation unit 170.

According to the Home-Plug AV standard, a preamble signal includes 8 symbols, each of which has a format known by a transmitting end and a receiving end. The preamble buffer unit 110 receives and stores a plurality of symbols of the preamble signal which can be either all or a part of the symbols of the preamble signal.

According to the embodiment, each symbol has been adjusted by an auto gain controller (not shown) for example of a previous circuit stage, and accordingly each symbol corresponds to a different gain control value. In other words, the symbols stored in the preamble buffer unit 110 are symbols amplified of different times instead of the original values as received by the receiving end.

Accordingly, according to an aspect of the embodiment, the gain adjusting unit 130 adjusts every symbol to a gain normalized symbol correspondingly, according to the gain control values of the symbols respectively. In such a way, all of the gain normalized symbols share a same amplifying time, thus eliminating the difference of amplifying times brought by the previous circuit stage to the symbols.

The demodulation unit 150 receives the gain normalized symbols, and demodulates the gain normalized symbols to obtain a frequency domain demodulation signal. Considering the OFDM technology is accommodated to the Home-Plug AV standard, in the current embodiment, each symbol is transmitted with M subcarriers for example. The demodulation unit 150 transforms each of the gain normalized symbols to frequency domain by a fast Fourier transform (FFT) or a discrete Fourier transform (DFT), and averages components of every gain normalized symbol at a $k^{th}$ subcarrier, and therefore obtains a frequency domain demodulation signal combined by the average component of each of the subcarriers. The frequency domain demodulation signal is represented by $Y_k$, in which k represents different subcarriers, and $Y_k$ represents an average of components of the gain normalized symbols at the $k^{th}$ subcarrier.

The estimation unit 170 receives the frequency domain demodulation signal, and performs a channel estimation about the frequency domain demodulation signal and the frequency domain reference values of the standard preamble signal to obtain a frequency response of the channel. According to the current embodiment, the frequency domain reference value of the standard preamble signal for example are components of the standard preamble signal before passing through the channel corresponding to different subcarriers, represented as $S_k$, in which k represents different subcarriers, and k is within the range of 0 to M−1.

The frequency domain demodulation signal $Y_k$ for example is the standard preamble signal after passing through the channel, and can be defined as $Y_k = H_k \cdot S_k$, in which $H_k$ represents the channel response. Therefore, in the current embodiment, the frequency response of the channel can be estimated by performing an estimation calculation with the frequency domain demodulation signal $Y_k$ and the standard preamble signal $S_k$. The estimation calculation for example is a multiplication calculation on the frequency domain, which equation is $\tilde{H}_k = Y_k \cdot S^*_k$, in which * represents a conjugate calculation, and $\tilde{H}_k$ for example represents the estimated frequency response.

As taught from the embodiment, the frequency domain demodulation signal $Y_k$ is obtained by averaging a plurality of symbols of the preamble signal. Therefore, the channel frequency response can be estimated to a relatively accurate degree according to the statistic theory. Below is another embodiment, in which a channel estimation apparatus is to be described in more details.

Figure 2:
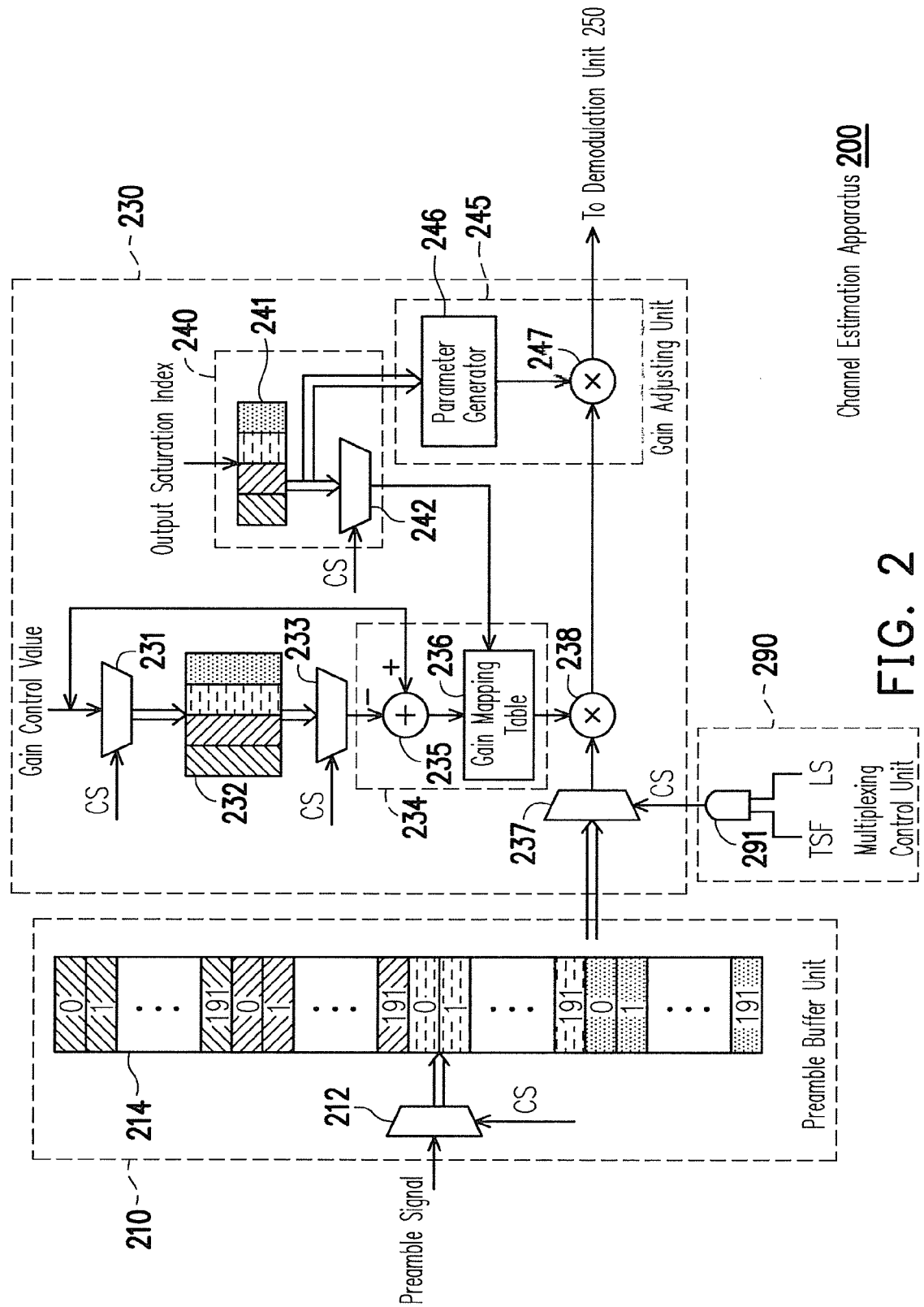
FIG. 2 is a block diagram illustrating a channel estimation apparatus according to another embodiment of the present invention.
Figure 3:
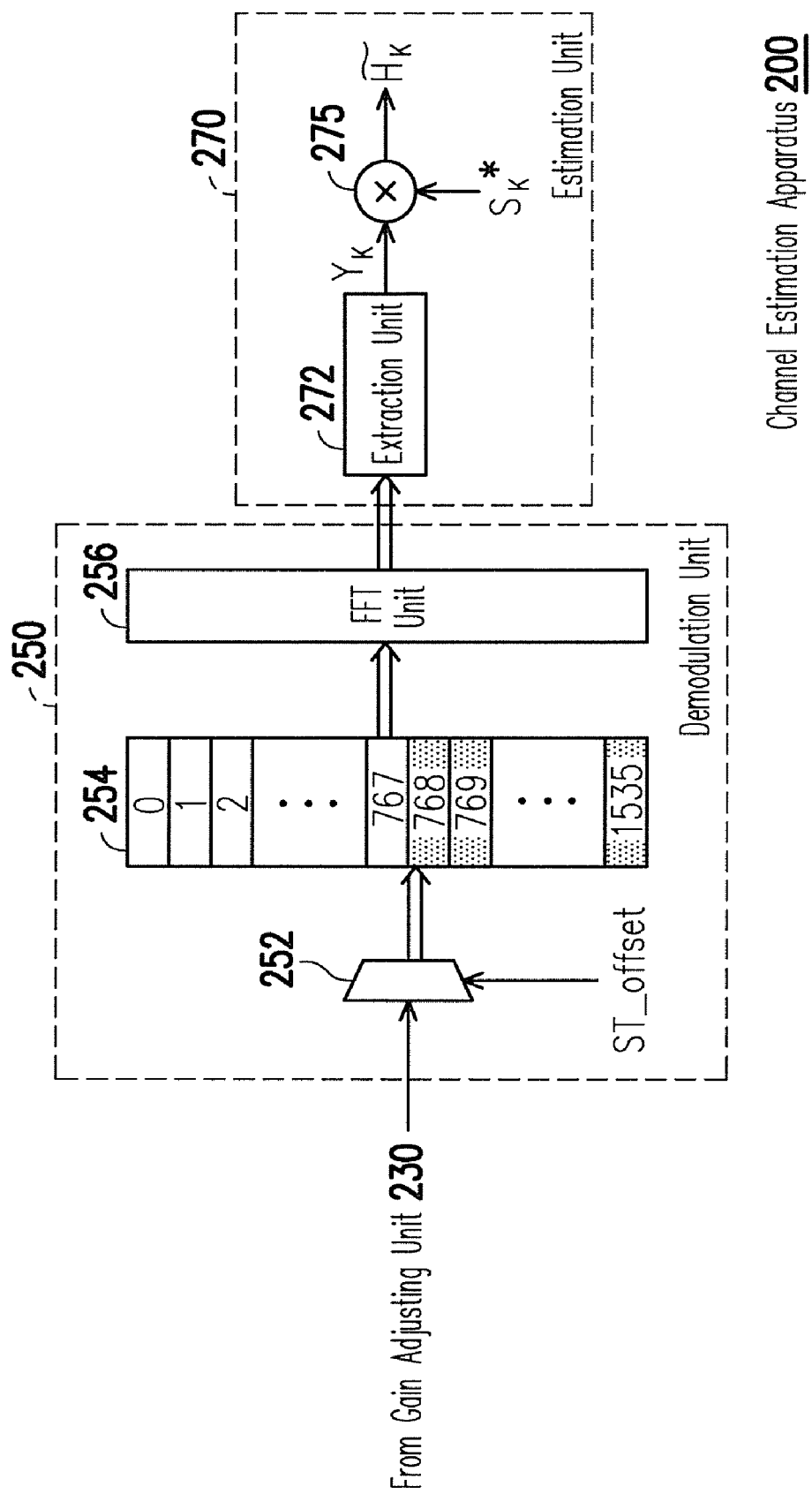
FIG. 3 is a block diagram illustrating a channel estimation apparatus according to another embodiment of the present invention.

FIGS. 2 and 3 are block diagrams illustrating a channel estimation apparatus according to another embodiment of the present invention. Referring to FIGS. 2 and 3, the channel estimation apparatus 200 includes a preamble buffer unit 210, a gain adjusting unit 230, a demodulation unit 250, an estimation unit 270, and a multiplexing control unit 290. Considering the complexity of the structure of the channel estimation apparatus 200, elements thereof are illustrated respectively in FIGS. 2 and 3. FIG. 2 illustrates the preamble buffer unit 210, the gain adjusting unit 230, and the multiplexing control unit 290. FIG. 3 illustrates the demodulation unit 250 and the estimation unit 270.

The preamble buffer unit 210 includes a multiplexer 212 and a plurality of sampling registers 214. The multiplexer 212 receives the preamble signal including a plurality of symbols which have been filtered and sampled by a previous circuit stage. Each of the symbols includes M sampling signals.

Because the instant embodiment is exemplified according to the Home-Plug AV standard, the preamble signal includes 8 symbols, each of which is transmitted with 192 subcarriers. According to the current embodiment, each symbol includes 192 sampling signals, which means M=192.

The sampling registers 214 of the preamble buffer unit 210 are coupled to the multiplexer 212 and adapted for storing the sampling signals of the symbols. The sampling registers 214 for example can store all or a part of the symbols of the preamble signal. According to an aspect of the present invention, the sampling registers 214 for example store 4 symbols of the preamble signal. Because each of the symbols includes 192 sampling signals, the preamble buffer unit 210 includes 768 sampling registers 214 for respectively storing the sampling signals of every symbol.

According to the embodiment, the sampling registers 214 for example are first in first out (FIFO) buffers. The multiplexer 212 for example determines whether to store the received preamble signal to the sampling registers 214 according to signals received by a control end. The multiplexing control unit 290 is coupled to the multiplexer 212. After the sampling registers 214 receive the preamble signal, the multiplexing control unit 290 outputs a control signal CS to instruct the multiplexer 212 to suspend output signals to the sampling registers 214, so as to prevent the sampling registers 214 from storing a payload signal after the preamble signal.

According to the Home-Plug AV standard, data are transmitted in packets. The preamble signal is positioned in a forepart of the packet. The receiving end uses the preamble signal for channel estimation, and for packet detection as well as timing synchronization. According to an aspect of the embodiment, the multiplexing control unit 290 for example is an AND gate 291. The AND gate 291 receives a timing synchronization finishing signal TSF and a last sampling signal LS. When the timing synchronization finishing signal TSF and the last sampling signal LS are enabled at the same time, the AND gate 291 enables a control signal CS to suspend an output from the multiplexer 212. When the timing synchronization finishing signal is enabled, it indicates a timing synchronization has been achieved at the receiving end; and when the 192 sampling signals of the symbols transmitted by the preamble signal are all inputted to the multiplexer in addition, the last sampling signal LS is then be enabled; and therefore, the control signal CS is then enabled. Meanwhile, 4 symbols of the preamble signal have been completely stored in the sampling register 214.

The gain adjusting unit 230 includes a multiplexer 231, a gain storing unit 232, a second multiplexer 233, a calculation unit 234, a third multiplexer 237, a first multiplication unit 238, an output saturation indication unit 240, and an averaging unit 245.

According to the instant embodiment, the symbols of the preamble signal for example have been adjusted by an auto gain controller (not shown) of a previous circuit stage, and thus each symbol corresponds to a different gain control value. Therefore, when the preamble buffer unit 210 receives and stores the preamble signal, the multiplexer 231 receives the gain control values corresponding to the symbols of the preamble signal, and output the same to the gain storing unit 232. According to the instant embodiment, when the control signal CS is enabled, it indicates that the sampling register 214 has completely stored 4 symbols of the preamble signal therein, and the gain storing unit 232 has also correspondingly stored the gain control values corresponding to the 4 symbols. As such, when the control signal CS is enabled, the multiplexer 232 suspends output of the gain control value to the gain storing unit 232.

According to the instant embodiment, when the control signal CS is enabled, it indicates that it indicates that the sampling register 214 has completely stored 4 symbols of the preamble signal therein, and the gain storing unit 232 has also correspondingly stored the gain control values corresponding to the 4 symbols. As such, when the control signal CS is enabled, the third multiplexer 237 starts to read out sampling signals of the 4 symbols stored in the sampling register 214, and the second multiplexer 233 also starts to correspondingly read out the gain control values stored in the gain storing unit 232.

The calculation unit 234 includes an addition unit 235 and a gain mapping table 236. The addition unit 235 is coupled to the second multiplexer 233, and is adapted to subtract the gain control value with a reference gain control value in sequence, and output gain difference values thereafter. The gain mapping table 236 then detects a gain adjusting ratio according to the gain difference values. In such a way, there are generated 4 gain adjusting ratios from the 4 gain control values stored in the gain storing unit 232, each of which being correspondingly applied a symbol of the preamble signal.

According to an aspect of the current embodiment, after receiving the preamble signal of the entire packet, the not shown auto gain controller of the previous circuit stage generates a fixed gain control value. According to a further aspect of the current embodiment, the fixed gain control value for example is the reference gain control value.

The multiplication unit 238 is coupled to the third multiplexer 237 and the gain mapping table 236 of the calculation unit 234. The multiplication unit 238 multiplies the 192 sampling signals of the symbols with the gain adjusting ratio corresponding to the symbols, and outputs a gain normalized symbol, which includes 192 gain normalized sampling signals.

It has been noted that when being transmitted through the channel, the preamble signal may suffer an excessive channel signal fading, so that when the not shown auto gain controller of the previous circuit stage adjusts the symbols of the preamble signal, an output saturation may occur which causes a symbol distortion of the preamble signal. If such a distorted symbol is relied on for channel estimation, the channel estimation won't be accurate.

As such, according to an aspect of the embodiment, the gain adjusting unit 230 further includes an output saturation indication unit 240. The output saturation indication unit 240 includes an output saturation recorder 241 and a fourth multiplexer 242. The output saturation recorder 241 is adapted for receiving and storing the output saturation indexes corresponding to the symbols.

According to an aspect of the present invention, the output saturation index for example is outputted from the not shown auto gain controller of the previous circuit stage. When the output saturation occurs, the not shown auto gain controller for example defines the output saturation index as 1, and when the output saturation does not occur, the not shown auto gain controller for example defines the output saturation index as 0.

In the embodiment, corresponding to the 4 symbols stored in the sampling register 214, the output saturation recorder 241 stores 4 output saturation indexes for indicating whether the 4 symbols stored in the sampling register 214 are output saturation signals. When the control signal CS is enabled, the fourth multiplexer 242 starts to read out the 4 output saturation indexes stored in the output saturation recorder 241 to the gain mapping table 236.

The gain mapping table 236 receives the output saturation indexes corresponding to the 4 stored symbols. At the same time, if a specific output saturation index among the 4 output saturation indexes is true, the gain mapping table 236 sets a gain adjusting ratio of a symbol corresponding to the specific output saturation index as 0. In other words, the gain mapping table 236 according to the current embodiment is adapted to multiply a symbol whose corresponding to a output saturation index is true with 0 at the multiplication unit 238. In such a way, those distort symbols are avoided from being relied for channel estimation.

In the embodiment, after adjusting 4 symbols of each preamble signal to 4 gain normalized symbols of a same amplifying time, and before outputting to the demodulation unit 250, the gain normalized symbols for example can be averaged in advance. Considering there might be distort symbols in the 4 symbols, according to an aspect of the embodiment, the averaging unit 245 generates an adjustment parameter for averaging the gain normalized symbols.

The averaging unit 245 includes a parameter generator 246 and a second multiplication unit 247. The parameter generator 246 is coupled to the output saturation recorder 241, and is adapted to determine an adjustment parameter according to a number of the output saturation indexes which are true in the output saturation recorder 241.

According to the embodiment, the adjustment parameters includes ¼, ⅓, ½, and 1. When only one of the output saturation indexes stored in the output saturation recorder 241 is true, the parameter generator 246 sets the adjustment parameter as ¼. When 2 of the output saturation indexes stored in the output saturation recorder 241 are true, the parameter generator 246 sets the adjustment parameter as ⅓. When 3 of the output saturation indexes stored in the output saturation recorder 241 are true, the parameter generator 246 sets the adjustment parameter as ½. When all of the 4 output saturation indexes stored in the output saturation recorder 241 are true, the parameter generator 246 sets the adjustment parameter as 1.

The second multiplication unit 247 receives the adjustment parameter outputted from the parameter generator 246, and multiplies the 192 gain normalized sampling signals of the gain normalized symbols with the adjustment parameter, and outputs the results to the demodulation unit 250.

Referring to FIG. 3, the demodulation unit 250 includes a fifth multiplexer 252, a plurality of input buffers 254 and a fast Fourier transform (FFT) unit 256. The fifth multiplexer 252 is coupled to the second multiplication unit 247, and adapted to in sequence receive the 192 gain normalized sampling signals of the gain normalized symbols after being gain averaged, and stores the same into the input buffers 254.

According to the current embodiment, when receives the preamble signal, the receiving end not only uses the preamble signal for channel estimation, but also uses the same for timing synchronization to find out a timing offset value of the received symbols. The timing offset value is adapted to for a timing calibration which is necessary for a demodulation by a post circuit stage. The fifth multiplexer 252 stores the 192 gain normalized sampling signals of the 4 gain normalized symbols into the input buffers 254 according to the timing offset. According to an aspect of the embodiment, there are for example 1536 input buffers 254, which are numbered as from 0 to 1535 in FIG. 2. For example, if the received symbol forwardly deviates 2 sampling periods, the fifth multiplexer 252 for example stores the first gain normalized sampling signal of the first gain normalized symbol into a number 2 input buffer 254, and the second gain normalized sampling signal of the first gain normalized symbol into a number 3 input buffer 254, and the rest can be deduced by analogy to store the gain normalized sampling signals of the 4 gain normalized symbols into the input buffers 254. The rest input buffers 254 having no gain normalized sampling signals stored are stored with 0. This method determines the positions of the input buffers to which the gain normalized sampling signals are to be stored according to the timing offset value, and is adapted for compensation of a phase response offset derived from the timing calibration in the channel estimation.

According to the Home-Plug AV standard, the OFDM technology is employed for transmitting data, in which the load signal is transmitted with M×L subcarriers. According to an aspect of the embodiment, M×L=192×8=1536. As such, a receiving end according to the Home-Plug AV standard typically includes a 1536-points FFT unit. Therefore, according to an aspect of the embodiment, the demodulation unit 250 includes a 1536-points FFT unit 256. The 1536-points FFT unit 256 for example can be complied with an FFT module of the receiving end.

The FFT unit 256 reads out all data stored in the input buffers 254, and performs a 1536-points FFT, so as to a frequency domain demodulation signal and output the same to the estimation unit 270. The frequency domain demodulation signal includes 1536 frequency domain components.

According to a further aspect of the embodiment, a 192-points FFT can also be employed in that all of the 192 gain normalized sampling signal s of the 4 gain normalized symbols are transformed to the frequency domain. Components of the 4 gain normalized symbols at every frequency are averaged and average values corresponding to different frequencies are obtained and defined as 192 frequency domain sampling signals. It can be known from a feature of the FFT, the 192 frequency domain sampling signals are included in the 1536 frequency domain components outputted from the FFT unit 256.

As such, according to the aspect of the embodiment, 192 frequency domain components are sampled from the 1536 frequency domain components in each L frequency domain components, in which L=8. For instance, the first frequency domain component is the first frequency domain sampling signal, and the eighth frequency domain component is the second frequency domain sampling signal.

The estimation unit 270 includes an extraction unit 272 and a third multiplication unit 275. The extraction unit 272 picks up one frequency domain sampling signal from each 8 frequency domain components in sequence and obtains 192 frequency domain sampling signals in total, which are represented as $Y_k$, in which k is between 0 to 191 for representing different subcarriers. This method is adapted for averaging the foregoing 4 gain normalized symbols.

The frequency domain sampling signal $Y_k$ for example is a standard preamble signal after passing through the channel, which can be defined with an equation $Y_k = H_k \cdot S_k$, in which $H_k$ represents the channel response and $S_k$ for example a frequency domain reference value of the standard preamble signal before passing through the channel, which is also components of the standard preamble signal at different subcarriers. In such a way, in the current embodiment, the frequency response of the channel can be estimated by performing an estimation calculation with the frequency domain sampling signal $Y_k$ and the frequency domain reference value $S_k$ of the standard preamble signal. The estimation calculation for example is a multiplication calculation on the frequency domain, which equation is $\tilde{H}_k = Y_k \cdot S^*_k$, in which * represents a conjugate calculation, and $\tilde{H}_k$ for example represents the estimated frequency response.

The third multiplication unit 275 of the estimation unit 270 is coupled to the extraction unit 272, and is adapted to multiply the 192 frequency domain sampling signals $Y_k$ with conjugate values of the frequency domain component $S_k$ of the standard preamble signal, so as to obtain an estimated frequency response $\tilde{H}_k$.

Then, a method for channel estimation is to be illustrated in details, according to the channel estimation apparatus as shown in FIG. 2.

Figure 4:
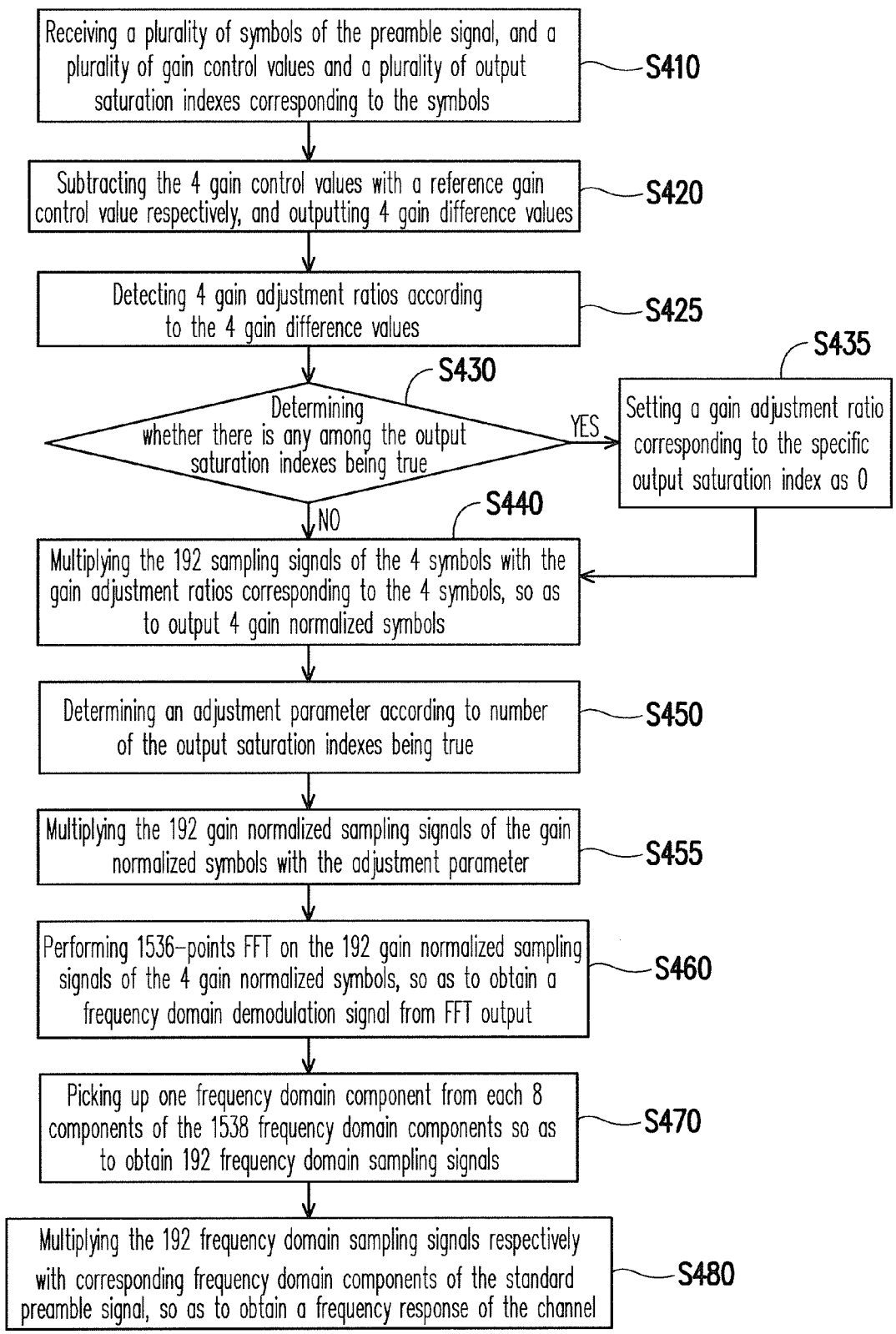
FIG. 4 is a flow chart illustrating a method for channel estimation according to an embodiment of the present invention.

FIG. 4 is a flow chart illustrating a method for channel estimation according to an embodiment of the present invention. Referring to FIG. 4, a first step S410 of the method includes receiving a plurality of symbols of the preamble signal, and a plurality of gain control values and a plurality of output saturation indexes corresponding to the symbols. According to the embodiment, the received symbols of the preamble signal for example are as the 192 sampling signals of the 4 symbols stored in the sampling register 214 as shown in FIG. 2. The 4 symbols correspond to 4 gain control values and 4 output saturation indexes, which are stored in the gain storing unit 232 and the output saturation recorder 241.

Then, a next step of the method is step S420, which includes subtracting the 4 gain control values with a reference gain control value respectively, and outputting 4 gain difference values. Then the method goes to a next step S425 which includes detecting 4 gain adjustment ratios according to the 4 gain difference values. According to the embodiment, the steps S420 and S425 for example correspond to the operation of the calculation unit 234 as shown in FIG. 2.

Then the method goes to a next step S430 which includes determining whether there is any among the 4 output saturation indexes being true. According to the embodiment, the gain mapping table 236 of the FIG. 2 reads out the 4 output saturation indexes to check each of the output saturation indexes and determine whether it is true.

If none of the output saturation indexes is determined as true, then the method goes to step S440, or if there is a specific output saturation index being determined as true, then the method goes to step S435 which includes setting a gain adjustment ratio corresponding to the specific output saturation index as 0, and goes to step S440 thereafter.

The step S440 includes multiplying the 192 sampling signals of the 4 symbols with the gain adjustment ratios corresponding to the symbols, so as to output 4 gain normalized symbols, each of which includes 192 gain normalized sampling signals.

Then the method goes to step S450, which includes determining an adjustment parameter according to number of output saturation indexes that are true. Then, the method goes to step S455 which includes multiplying the 192 gain normalized sampling signals of the gain normalized symbols with the adjustment parameter. According to the embodiment, the steps S450 and S455 for example correspond to the operation of the averaging unit 245 as shown in FIG. 2.

Then, the method goes to step S460, which includes performing a 1536-points FFT calculation about the 192 gain normalized sampling signals of the 4 gain normalized symbols, so as to output a frequency domain demodulation signal. The frequency domain demodulation signal includes 1536 frequency domain components. According to the embodiment, the step S460 for example corresponds to the operation of the demodulation unit 250 as shown in FIG. 3

Then, the method goes to step S470 which includes picking up one frequency domain component from each 8 components of the 1538 frequency domain components so as to obtain 192 frequency domain sampling signals. In the current embodiment, the step 470 for example corresponds to the operation of the extraction unit 272 as shown in FIG. 3.

Finally, the method goes to step S480, which includes multiplying the 192 frequency domain sampling signals respectively with corresponding frequency domain components of the standard preamble signal, so as to obtain a frequency response of the channel. In the current embodiment, the step S480 corresponds to the operation of the third multiplication unit 275 as shown in FIG. 3.

Although the method is illustrated in accordance with the hardware taught by FIGS. 2 and 3, those of ordinary skill in the art should be aware of the foregoing teaching is for illustration purpose and is not to restrict the scope of the present invention. The foregoing steps may also be applied with a software, or with by a combination of a software and a hardware.

In summary, the present invention takes advantages of a plurality of symbols of a preamble signal, so as to achieve accurate channel estimation, for compensating damages of the signals because of the channel variation and for further achieving a correct coherent detection. Furthermore, except complying with the hardware as taught above, the method provided by the present invention can also be conveniently complied with software, or application specific integrated circuit (ASIC).

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A channel estimation apparatus, comprising:
a preamble buffer unit, adapted for receiving and storing a plurality of symbols of a preamble signal, the symbols corresponding to a plurality of gain control values;
a gain adjustment unit, adapted for adjusting the symbols to a plurality of gain normalized symbols according to the gain control values;
a demodulation unit, adapted for receiving and demodulating the gain normalized symbols to obtain a frequency domain demodulation signal;
an estimation unit, receiving the frequency domain demodulation signal, and multiplying the frequency domain demodulation signal with a conjugate value of a frequency domain reference value of a standard preamble signal to obtain a frequency response of a channel; and
a multiplexing control unit, coupled to the preamble buffer unit and the gain adjustment unit, and adapted for outputting a control signal for controlling the preamble buffer unit and the gain adjustment unit.

2. The channel estimation apparatus according to claim 1, wherein each of the symbols comprises M sampling signals, and the preamble buffer unit comprises:
a plurality of sampling registers, for storing M sampling signals of the symbols respectively; and
a first multiplexer, for receiving the symbols of the preamble signal, and determining whether to output the symbols to the sampling registers according to the control signal, wherein M is a natural number.

3. The channel estimation apparatus according to claim 2, wherein the gain adjustment unit comprises:
a gain storing unit, for storing the gain control values corresponding to the symbols;
a second multiplexer, for determining whether to read out the gain control values stored in the gain storing unit according to the control signal;
a calculation unit, coupled to the second multiplexer, for comparing the gain control value with a reference gain control value, and outputting a plurality of gain adjustment ratios corresponding to the symbols;
a third multiplexer, for determining whether to read out the symbols stored in the sampling registers according to the control signal; and
a first multiplication unit, coupled to the third multiplexer and the calculation unit, for multiplying M sampling signal with the gain adjustment ratios corresponding to the symbols, so as to output the gain normalized symbols, wherein the gain normalized symbols comprise M gain normalized sampling signals.

4. The channel estimation apparatus according to claim 3, wherein the calculation unit comprises:
an addition unit, coupled to the second multiplexer, for subtracting the gain control values respectively with the reference gain control values, and outputting a plurality of gain difference values; and
a gain mapping table, for detecting the gain adjustment ratios according to the gain difference values.

5. The channel estimation apparatus according to claim 4, wherein the gain adjustment unit further comprises:
an output saturation indication unit, for receiving and recording a plurality of output saturation indexes corresponding to the symbols.

6. The channel estimation apparatus according to claim 5, wherein the output saturation indication unit comprises:
an output saturation recorder, for receiving and storing the output saturation indexes corresponding to the symbols; and
a fourth multiplexer, for reading out the output saturation indexes stored in the output saturation recorder to the gain mapping table,
wherein the output saturation indexes correspond to the gain adjustment ratios of the symbols, and if a specific one of the output saturation indexes is true, the gain mapping table sets a specific one of the gain adjusting ratios corresponding to the specific one output saturation index as 0.

7. The channel estimation apparatus according to claim 6, wherein the gain adjustment unit further comprises:
an averaging unit, coupled to the first multiplication unit and the output saturation recorder, for determining number of the output saturation indexes which are true, and generating an adjustment parameter for performing a parameter adjustment calculation to the gain normalized symbols.

8. The channel estimation apparatus according to claim 7, wherein the averaging unit comprises:
a parameter generator, for determining number of the output saturation indexes which are true, and generating an adjustment parameter according to the quantity; and
a second multiplication unit, for multiplying the M gain normalized sampling signals of the gain normalized symbols with the adjustment parameter.

9. The channel estimation apparatus according to claim 7, wherein the demodulation unit comprises:
a plurality of input buffers, for respectively storing the M gain normalized sampling signals of the gain normalized symbols, wherein the input buffers comprise M×L signal samples, in which L is a natural number;
a fifth multiplexer, for outputting the M gain normalized sampling signals of the gain normalized symbols to the input buffers according to and timing offset of the symbols; and
a fast Fourier transform (FFT) unit, capable of M×L points of FFT calculation, for performing an M×L points of FFT calculation with the M gain normalized sampling signal of the gain normalized symbols stored in the input buffers, so as to output the frequency domain demodulation signal,
wherein the frequency domain demodulation signal comprises M×L frequency domain components.

10. The channel estimation apparatus according to claim 9, wherein the estimation unit comprising:
an extraction unit, for picking up one frequency domain sampling signal from each L frequency domain components in sequence so as for obtaining M frequency domain sampling signals from M×L frequency domain components; and
a third multiplication unit, coupled to the extraction unit, for multiplying the M frequency domain sampling signals with a frequency domain reference value corresponding to the standard preamble signal, so as to obtain an estimated frequency response.

11. A method for channel estimation, comprising:
receiving a plurality of symbols of a preamble signal, wherein the symbols correspond to a plurality of gain control values;
adjusting the symbols to a plurality of gain normalized symbols according to the gain control values;
demodulating the gain normalized symbols and obtaining a frequency domain demodulation signal;
multiplying the frequency domain demodulation signal with a conjugate value of a frequency domain reference value of a standard preamble signal, so as to obtain a frequency response of a channel;
subtracting the gain control values with a reference gain control value respectively, and outputting a plurality of gain difference values;
detecting a plurality of gain adjustment ratios according to the gain difference values; and
multiplying M sampling signals of the symbols with the gain adjustment ratios corresponding to the symbols, so as to output the gain normalized symbols, each of which comprising M gain normalized sampling signals, wherein M is a natural number.

12. The method for channel estimation according to claim 11 further comprising:
receiving a plurality of output saturation indexes; and
if a specific one of the output saturation indexes is true, then setting a gain adjustment ratio corresponding to the specific output saturation index as 0.

13. The method for channel estimation according to claim 12 further comprising:
determining an adjustment parameter according to number of output saturation indexes which are true; and
multiplying the M gain normalized sampling signals of the gain normalized symbols with the adjustment parameter.

14. The method for channel estimation according to claim 13, wherein the step of demodulating the gain normalized symbols and obtaining a frequency domain demodulation signal comprises:
performing an M×L points of fast Fourier transform (FFT) on the M gain normalized sampling signal of the gain normalized symbols, to obtain the frequency domain demodulation signal by the FFT output, wherein the frequency domain demodulation signal comprises M×L frequency domain components and L is a natural number.

15. The method for channel estimation according to claim 14 further comprising:
picking up one frequency domain component from each L frequency domain components in sequence, so as to obtain M frequency domain sampling signals from M×L frequency domain components; and
multiplying the M frequency domain sampling signals with a frequency domain reference value corresponding to the standard preamble signal, so as to obtain an estimated frequency response of the channel.

* * * * *